INVENTOR
F. B. LLEWELLYN
BY Harry C. Hart
ATTORNEY

Feb. 27, 1951 F. B. LLEWELLYN 2,543,116

MEANS AND METHOD FOR THE SECRET TRANSMISSION OF MESSAGE INTELLIGENCE

Filed July 8, 1946 4 Sheets-Sheet 2

INVENTOR
F. B. LLEWELLYN
BY Harry C. Hart
ATTORNEY

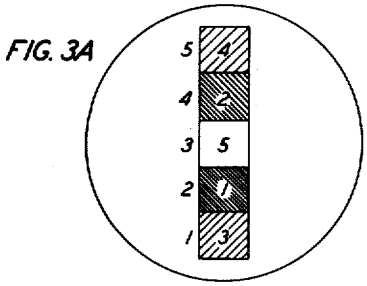
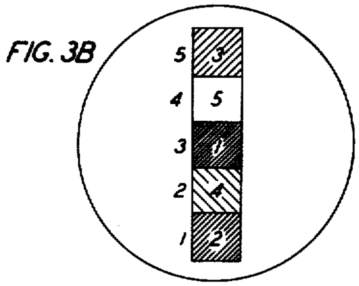
FIG. 5
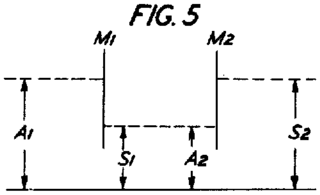
FIG. 8
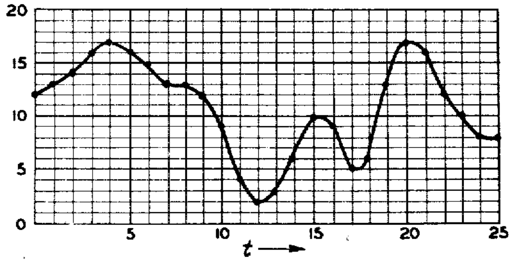
FIG. 9
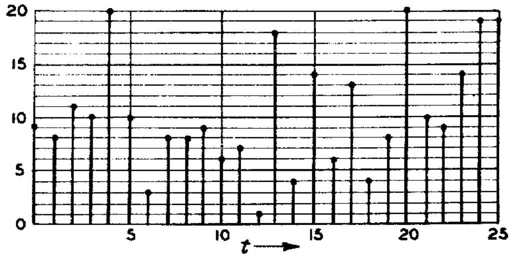
FIG. 10
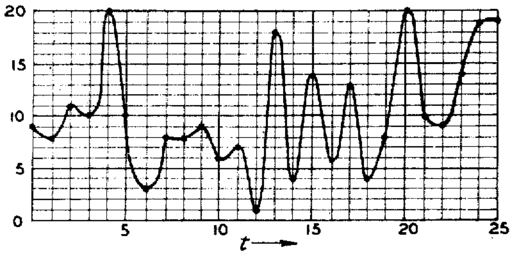
INVENTOR
F. B. LLEWELLYN
BY Harry C. Hart
ATTORNEY INVENTOR
F. B. LLEWELLYN
BY Harry C. Hart
ATTORNEY Patented Feb. 27, 1951

2,543,116

UNITED STATES PATENT OFFICE 2,543,116

MEANS AND METHOD FOR THE SECRET TRANSMISSION OF MESSAGE INTELLIGENCE

Frederick B. Llewellyn, Summit, N. J., assignor to Bell Telephone Laboratories, Incorporated, New York, N. Y., a corporation of New York Application July 8, 1946, Serial No. 681,901

17 Claims. (Cl. 179—1.5)

This invention relates to systems and methods of transmission with privacy. It is applicable to line wire or radio transmission and to the sending of speech messages, pictures, telegraph signals, or any other type of signals which may be transmitted from point to point by electrical means.

A general object of the invention is to increase the difficulty of unauthorized reception of a signal, message, or wave being transmitted.

A related object is to facilitate alteration of a signaling code or cipher with a minimum of alterations to apparatus components.

Another object is to utilize the advantages which are inherent in time division multiplex transmission systems for the transmission of information in code or cipher.

Communication systems have been devised in which electric signals corresponding to speech or other signals to be privately transmitted have been scrambled, garbled, or otherwise rendered more or less unintelligible in various ways. Their frequency components have been inverted with respect to a selected nominal frequency; they have been broken up into short segments which are then transmitted in alternation with corresponding short segments of another message; they have been recorded, inverted with respect to time (picked up backward) and transmitted so inverted; their transmission rate has been widely varied at a fairly high rate; and many other devices have been employed to make the relation between the electric signal as transmitted and the original message to be transmitted unobvious and therefore undecipherable. Such systems are characterized, in the main, by a perturbation or other masking effect which follows a definite and prescribed pattern, either recurring periodically in time or involving a definite numerical relation between the component frequencies of the plain message and those of the ciphered message. In general, this pattern is separate and distinct from the message to be transmitted and is unrelated to the peculiarities of the particular message, being controlled entirely by means external to portions of the apparatus or circuit which carry the message signals themselves.

In contradistinction to such systems, in accordance with the present invention, a coded or ciphered signal is derived from a novel cooperative relation between a ciphering or coding element and the plain message itself which gives rise to a ciphered signal whose characteristics are unrelated to those of the plain message except by way of a relation which is wholly arbitrary, and easily alterable at will. The invention provides means and methods for so enciphering a message at a transmitter station and correspondingly for deciphering it at a receiver station.

Features of the present invention are that there is no definitely assignable numerical relation between the component frequencies of the message and those of the cipher signal; that there is no definite pattern or time sequence with which the coding or ciphering step is carried out; and that the coding or ciphering is under the principal control of the message to be coded. A related feature is that auxiliary apparatus required for coding is reduced in amount and complexity.

Communication systems have been devised in which there is transmitted a sequence of pulses, of short duration, recurring at equal time intervals, and of magnitudes proportional to the instantaneous magnitudes of corresponding portions of a message to be transmitted. The pulses, which are in effect samples of the message wave, are transmitted to a receiving station where the original message may be reconstituted by proper treatment of them. From the characteristics of the pulse sequence such systems have been termed pulse-amplitude-modulation systems. From the fact that it is possible simultaneously to transmit over a single transmission path several such pulse sequences without serious interference, distinguishing each sequence from the others on a time division basis, such systems have been termed time division multiplex systems.

It is a further object of the present invention to encipher a message signal to be transmitted in the form of a sequence of pulses at a transmitter station, the pulse amplitudes being related to the signal amplitudes only by way of an arbitrary code; to translate this pulse sequence, in turn, into a cipher signal suitable for transmission; to transmit this cipher signal to a receiver station; and there to decipher the transmitted cipher signal and therefrom to reconstitute the original message.

Thus, in one aspect the invention relates to a transmission system in which a complex wave form to be transmitted is sampled at definite intervals and the sample amplitudes are translated into a sequence of cipher pulses, the amplitudes of the cipher pulses bearing an arbitrary relation to the amplitudes of the corresponding message samples.

From the apparatus standpoint another feature of the invention relates to a cathode beam tube in which the beam is deflected by an amount which is a function of, or under the control of, the amplitude of the message wave, giving rise, through the agency of a novel ciphering means, to an enciphered signal suitable for privacy transmission. A related feature of the invention resides in the transmission of received signals, enciphered in accordance with an arbitrary scheme, through a second cathode beam tube similar to the cathode beam tube at the transmitting station, but equipped with a compensating arrangement to translate a received ciphered signal back into the original message wave, in which form it is intelligible or may be rendered so with conventional apparatus.

In accordance with the present invention in one of its preferred forms, a cathode beam at the transmitting station is swept over a fluorescent screen to actuate or illuminate a target or mask. The sweeping action is carried out under the sole control of a selected characteristic of the message to be transmitted, for example, the message amplitude, while at the same time the beam is pulsed, or otherwise caused to impinge on or actuate the mask only intermittently. The mask itself preferably has a plurality of discrete regions, serially arranged in a line parallel with the direction of the cathode beam sweep, each region having a different transmission characteristic. When the cathode beam instantaneously coincides, in the course of its sweep, with one of these regions, a signal is transmitted which is related to the transmission characteristic of that particular region and to the strength of the cathode beam, but only indirectly to the message signal amplitude. The message signal amplitude selects the region actuated by the beam, and no more. The transmission characteristics of the region and the cathode beam strength exclusively determine the magnitude of the transmitted signal. The cathode beam pulses should recur at a rate which is at least twice as high as the frequency of the highest message component frequency to be transmitted. The pulsing may be carried out in any convenient way, for example, by periodically energizing and deenergizing the cathode beam at the required rate, or by deflecting it transversely across the mask.

The only restriction placed upon the arbitrary character of the transmission characteristics of the mask is that no two regions shall have identical transmission characteristics. In other words, if $n$ different message signal values, measured from one extreme of the beam deflection to the other, are to be distinguished, the mask may have at least $n$ regions with $n$ different transmission characteristics distributed among them in an entirely arbitrary manner.

Thus there is generated a sequence of ciphered output signal pulses which recur regularly at the pulsing rate and whose magnitudes are related to the original message amplitudes only by way of the arbitrary relation which is built into the coding mask. From the component frequency standpoint the resulting output signal may be thought of as consisting of the fundamental pulse frequency, modulated with the ciphered signal, and a series of harmonics of the pulse frequency, each similarly modulated. Because the pulses are all measured in one direction from the zero datum (in the language of currents, because the current pulses are all of the same sign) the output also contains an approximately steady or "D. C." component whose magnitude is equal to the average value of the pulses over a cycle of the signal frequency. This "steady" component is likewise modulated by the ciphered signal. In accordance with principles developed in the time division multiplex art, it is therefore feasible without degrading the information content of the ciphered signal, to insert a low-frequency pass filter following the ciphering apparatus and ahead of the transmission apparatus, whose pass band extends from approximately zero to the highest frequency of the plain message to be transmitted. This serves to restrict the frequency space allocated to the system to a band no greater than would be required for transmission of the plain message by conventional means. The effects of this pulse modulation by itself are in accordance with the principles of time division multiplex systems as explained in W. R. Bennett Patent 2,213,938 and in "Time Division Multiplex Systems," by W. R. Bennett, Bell System Technical Journal, volume 20, April 1941, page 199. This pulsing serves two purposes. First, it reduces the range of the frequency pass band of the transmission path required for undistorted transmission of the enciphered signals; and second, because when the beam is so pulsed at the high message frequencies it may skip one or more regions of the coding mask between regions successively impacted, it introduces a further arbitrary coding feature into the enciphered signal.

At the receiver station identical apparatus may be employed for deciphering or decoding the received coded message, with the exception that a definite relation must obtain between the transmission characteristics of the receiver mask and those of the transmitter mask, point for point or region for region. Synchronization of receiver pulses with transmitter pulses may be carried out in any desired manner and with conventional apparatus.

The above, as well as additional features of the invention will be better understood by reference to the following description taken with the accompanying drawings, in which:

Fig. 3A is a simplified diagram of a coding mask in accordance with the invention;

Fig. 3B is a simplified diagram of a corresponding decoding mask;

Fig. 5 is a diagrammatic representation of the successive steps which take place in the enciphering and deciphering process;

Fig. 8 is a curve showing the complex wave form of a plain message to be transmitted and the amplitudes of successive samples thereof;

Fig. 9 shows a sequence of enciphered signal pulses corresponding to the message of Fig. 8; and Fig. 10 shows the wave form of a ciphered signal to be transmitted.

Figure 1:
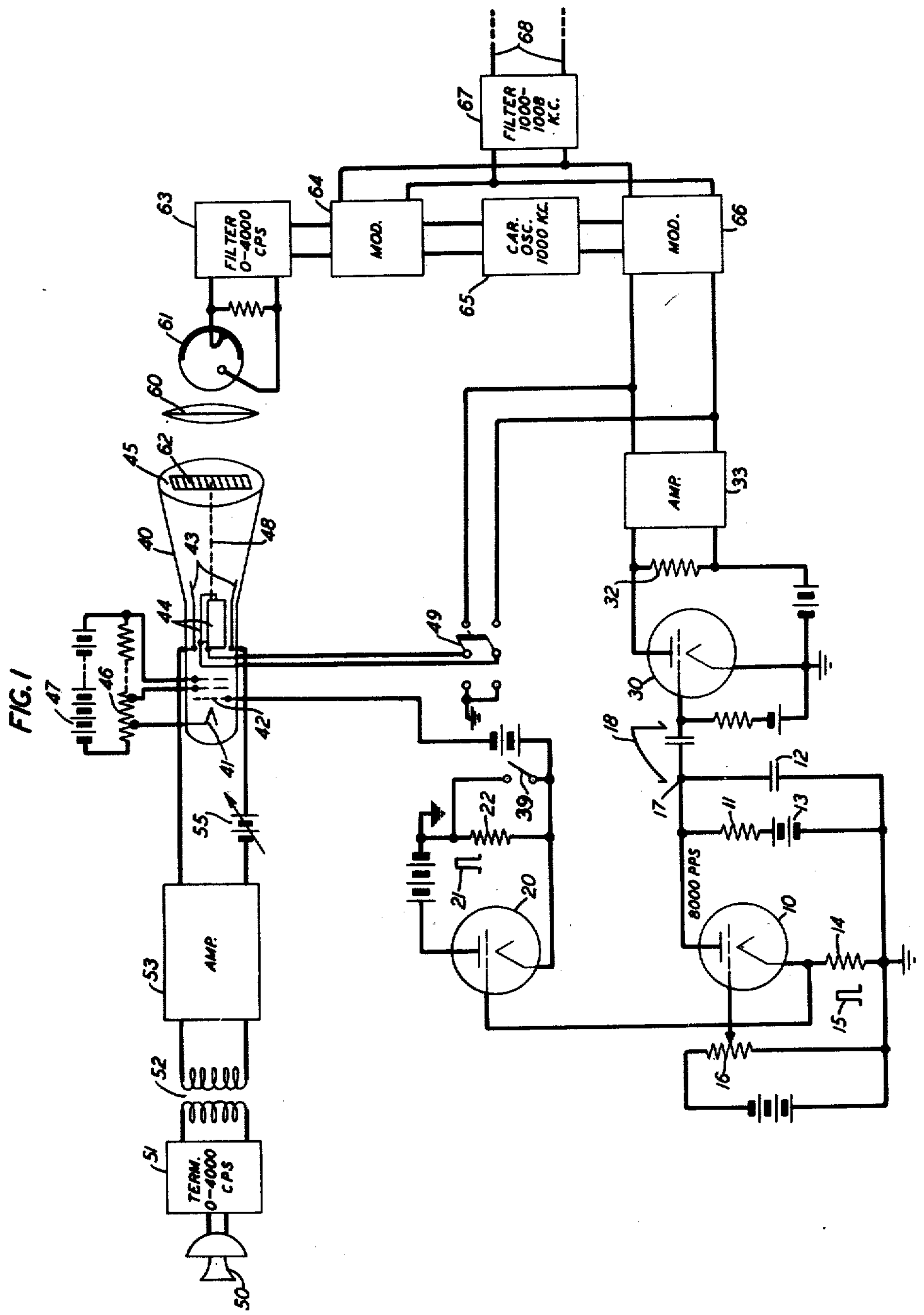
Fig. 1 is a schematic circuit diagram of apparatus suitable for carrying out the invention at the transmitter end of a communication system.

Referring to Fig. 1, there is shown a relaxation oscillator comprising the gas tube 10 and associated circuit elements. This relaxation oscillator is of a type well known in the art and includes a resistor 11 through which a condenser 12 may be charged by a battery 13. Assuming that, to start with, the condenser 12 is discharged, then when the system is energized, it is charged at a rate determined by the magnitude of the resistor 11. When the potential of the condenser 12 and the anode of the tube 10 rise to a "firing" value, the condenser 12 suddenly discharges through the tube 10 and the resistor 14. The discharge is of short duration and gives rise to a sharp positive voltage pulse 15 across the resistor 14. The duration of this pulse and the interval after which it is followed by an identical pulse can be completely controlled by varying the parameters of the circuit; such as by varying the values of the elements 11, 12 and 13 and by varying the voltages or potentials applied to the tube 10 as for example, the potential of the grid of tube 10 as determined by adjustment of the movable tap of a potentiometer 16. While any of several forms of oscillator circuits may be used to generate the pulses 15, the relaxation oscillator shown is simple and satisfactory. Its operation is more fully described in many publications such as "Ultra-high Frequency Techniques," by J. G. Brainerd et al. (Van Nostrand, 1942), at page 184.

The positive pulse 15 so formed may now be used to control the sampling of the message, as by pulsing or lateral deflection of a cathode beam. In particular, the pulse 15 may be transferred directly to the grid of a triode 20, giving rise to a similar positive pulse 21 across a cathode resistor 22, to be used as hereinafter described. In addition, the charging of the condenser 12 raises the potential of the point 17 gradually along a logarithmic curve 18, and by suitable adjustment of the capacitance of the condenser 12, the resistance of resistor 11, and the voltage of battery 13, the rise of potential at 17 may be made substantially linear over the essential operating range. This potential which recurs at the pulsing frequency of the relaxation oscillator, is applied to the grid of tube 30 where it gives rise, across anode resistor 32 and at the output terminals of an amplifier 33 to a similar rising voltage of saw-tooth form commonly and advantageously used for the sweep circuits of many well-known oscillascope apparatus, being here applied in a manner to be described.

Any other of the many known arrangements for generating short, sharp pulses and substantially linear saw-tooth form waves may be employed, in place of the exemplary arrangement shown, if it be so desired.

The parameters of the relaxation oscillator may be adjusted so that the pulses derived across resistor 14 recur at a frequency or repetition rate desired, this rate usually being the frequency at which the complex wave is to be sampled or pulsed. For the purposes of the invention it is preferred that the sampling rate and therefore the pulse rate shall be at least twice as great as the frequency of the highest frequency component of the message wave to be transmitted. If, for example, this wave is to be a speech wave and it is desired to transmit all components up to and including 4,000 cycles per second, then a suitable value for the relaxation oscillator frequency would be 8,000 cycles per second, although a higher value may be used if desired.

Referring now to the upper portion of Fig. 1 there is shown a cathode beam tube 40 which may comprise an evacuated envelope containing a cathode 41, a control grid 42, focussing electrodes for forming a beam 48, vertical electrostatic deflection plates 43, horizontal electrostatic deflection plates 44 and a fluorescent screen 45. Operating voltages may be applied to the various electrodes as from a potentiometer 46 supplied from any convenient direct current source such as a battery 47. The saw-tooth wave pulses which appear at the output terminals of the amplifier 33 may be impressed on the horizontal deflection plates 44 of the tube 40. The short, sharp pulses 21 appearing across the output resistor 22 of the triode 20 may be applied to the control grid 42 of the cathode beam tube 40. Two switches 39, 49 are shown in the associated control circuit, one of which, 39, when closed, connects the upper terminal of output resistor 22 of the triode 20 to ground and therefore nullifies the output of this tube and removes the pulses 21 from the control grid 42 of the cathode ray tube 40. The other switch 49, in the horizontal deflection circuit, when thrown to the left (in the figure) removes the saw-tooth waves from the horizontal deflection plates 44 and grounds them, thus effectively removing them from the circuit. As will be explained hereinafter, the pulsing voltage on the cathode ray tube control grid 42 and the horizontal saw-tooth deflection voltage on the horizontal deflection plates 44 are alternative to one another for many purposes. Therefore, if one or other of these devices is definitely preferred to the other, the apparatus associated with the other may be entirely omitted. However, circumstances may arise in which it is desirable to employ them both, and they have therefore both been shown in the drawings with provision for deenergizing either one or the other at will.

A source of a message signal to be enciphered, for example a microphone 50 and terminal equipment 51 is coupled, by way of a transformer 52 and a variable gain amplifier 53 to the vertical deflection plates 43 of the cathode beam tube 40. A biasing source 55 may be employed to give the electron beam a steady deflection corresponding to the quiescent or no-signal condition.

In front of the fluorescent screen 45 of the cathode ray tube 40 is positioned a lens 60 which is arranged to collect the light from the screen 45 and project it onto a photoelectric cell 61, whose output current passes by way of a low-pass filter 63 to suitable transmission apparatus. The pass band of the filter 63 may be equal to the frequency band of the original message, e. g., in the present example, 0–4000 cycles per second. Between the cathode beam 48 and the lens 60 and preferably lying snugly against the outer wall of the front face of the tube 40 is placed the coding mask 62 of the invention, which is described in detail below. All parts of the front face of the cathode ray tube 40 whose light might reach the lens without passing through the mask may be blanked off, if desired.

The apparatus thus far described is sufficient to effect the coding of the signal in accordance with the invention, and the output current of the photoelectric cell may be transmitted without further modification to a receiver station, if desired. However, it may equally well be modulated as by a modulator 64 onto a suitable carrier frequency derived, for example, from a carrier frequency oscillator 65 and be transmitted to the receiver station as modulations of this carrier wave. At the same time, a suitable synchronizing signal may be transmitted as other modulations of the same carrier wave. For this purpose, the output of the saw-tooth wave amplifier 33 may be modulated, as by a modulator 66 onto the same carrier wave and the two signals, i. e., the enciphered signal and the synchronizing signal, may be then transmitted to the receiver station separately or together through a band-pass filter 67 and over a transmission line 68. The pass band of the filter 67 need be no wider than is necessary to transmit the original message signal and the synchronizing signals, e. g., in the example chosen it should transmit from 1,000 kilocycles to 1,004 kilocycles and should also transmit the upper side frequency of the synchronizing signals, i. e., 1,008 kilocycles.

The ciphering mask 62 of the invention is diagrammatically illustrated in Fig. 3A and a corresponding deciphering mask is shown in Fig. 3B. The ciphering mask comprises a linear series of discrete regions. For the sake of simplicity of illustration, five are shown, though in practice some hundred or more should be employed for the transmission of high-quality speech. Each of these regions is characterized by a different light-transmission value or a different degree of opacity. The various light-transmission values are distributed among the regions of the mask in a wholly random manner, the only restriction on the arrangement of the transmitter mask being that there be as many different light-transmission values as there are different regions. In the distribution chosen for illustration in Fig. 3A, the light-transmission values of the five regions are, in order, proportional to the numbers 3, 1, 5, 2, 4 from the foot of the mask to its head, while the light-transmission values of the compensatory receiver mask, Fig. 3B, are proportional to the numbers 2, 4, 1, 5, 3 in the same order.

Figure 4A:
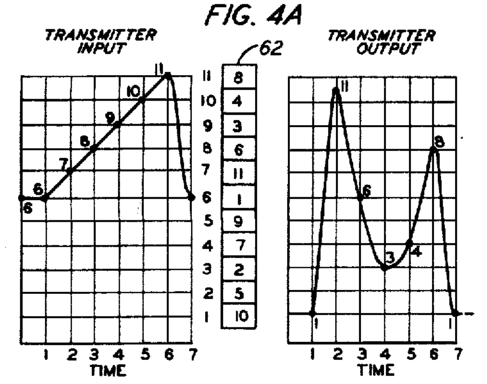
Fig. 4A is a diagram illustrating the ciphering, by means of a transmitter mask, of a slowly changing portion of a message signal.

The mode of operation of the invention will be explained in conjunction with a mask of eleven discrete regions having eleven different light-transmission values, and, for simplicity of explanation, in conjunction with a uniformly increasing message signal. Referring to Fig. 4A, a mask 62 is indicated with its eleven regions numbered consecutively from foot to head, the identifying number for each region being placed to the left of the box which represents the region. The number within each box is proportional to the light-transmission value of the region represented by that particular box. To the left of the mask is a portion of a message wave taken, for the sake of simplicity of explanation, as increasing uniformly from a zero value up to a point and then returning abruptly to the original zero value. This wave form also represents the deflection of the transmitter cathode beam 48 from its quiescent or no-signal position which, in this example, is taken as the "centered" position in which the beam passes midway between the vertical deflection plates 43 and impinges on that part of the fluorescent screen 45 which lies immediately behind the central or sixth region of the mask 62. The light-transmission value of this region has been selected at random as proportional to the number 1.

Assume, now, that the bias source 55 of Fig. 1 has been so adjusted that, in the absence of a signal to be enciphered, the cathode beam 48 is centered. When a message signal, derived from the microphone 50, is impressed on the vertical deflection plates 43 of the tube 40 the cathode beam 48 will be deflected under control of the message signal, upward or downward along the screen 45 adjacent the mask 62.

Figure 2:
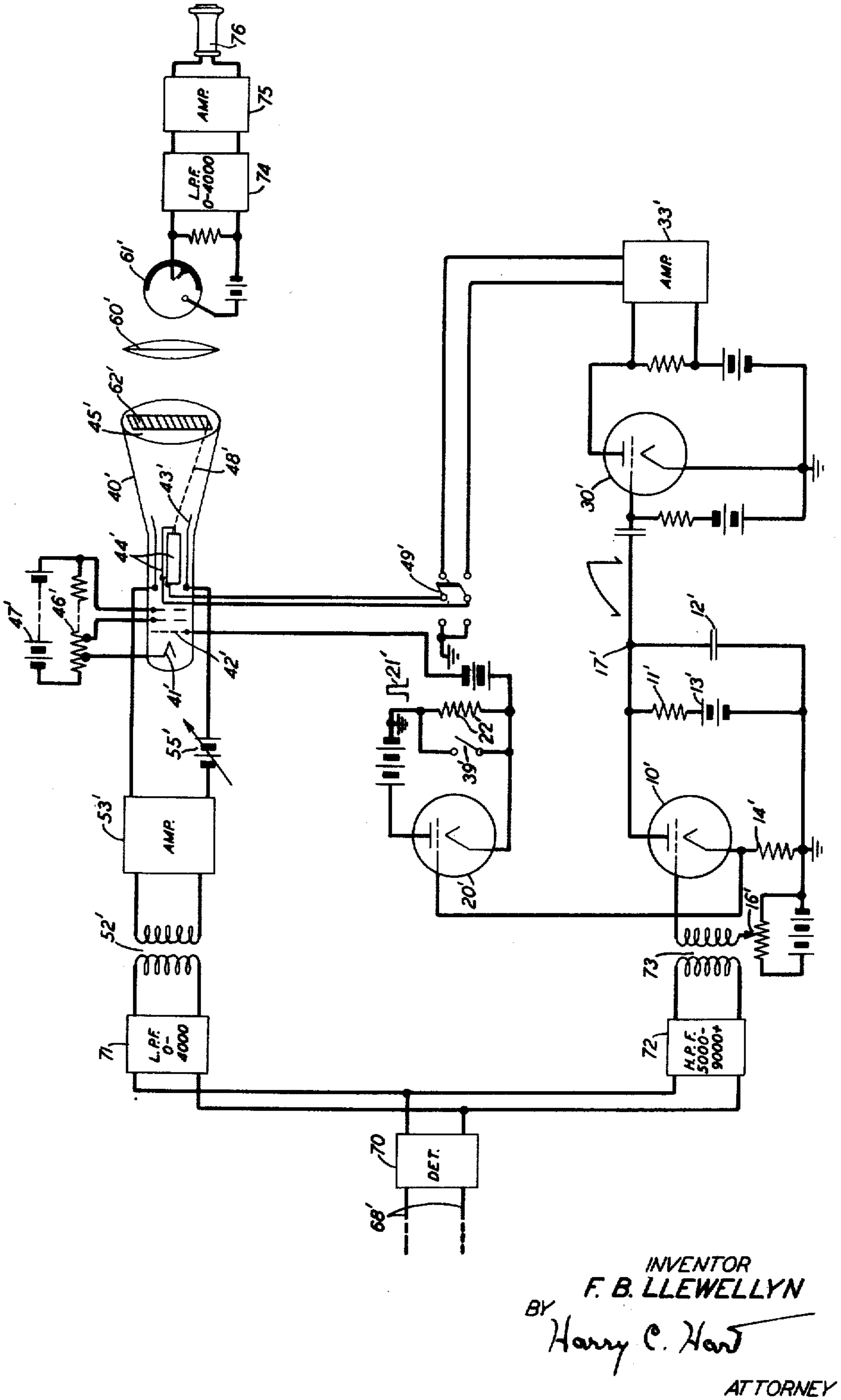
Fig. 2 is a schematic diagram of apparatus suitable for carrying out the invention at the receiver end of a communication system.
Figure 4B:
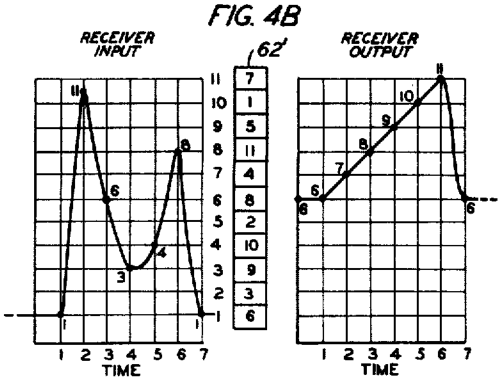
Fig. 4B is a diagram illustrating the deciphering of the ciphered signal of Fig. 4A by means of a compensatory receiver mask and the reconstruction of the original message signal.

Assume, for purposes of explanation, that the polarity of the particular part of the message signal under discussion is such that the signal-controlled deflection is upward and that the message signal amplitudes are successively proportional to the numbers 0, 1, 2, 3, 4, 5, and change slowly from each value to the next, returning then to zero. When the constant bias of value 6 is added to these the beam moves slowly upward from the sixth region over the regions 7, 8, 9, 10, 11 in succession and returns abruptly to the sixth region. The light-transmission values are thus proportional to the numbers 1, 11, 6, 3, 4, 8, 1, respectively. The photocell 61 thus receives light of values 1, 11, 6, 3, 4, 8, 1 and a corresponding signal of these successive values is carried over the transmission path 68 to the receiver station. Referring to Fig. 2, the receiver apparatus is provided with a similar bias source 55′, adjusted to cause the quiescent or no-signal deflection of the receiver beam 48′ to be such that the beam strikes a part of the fluorescent screen 45′ which lies immediately behind the first region of a receiver mask 62′ whose light-transmission values are compensatory to those of the transmitter mask 62. The compensatory arrangement is shown for a pair of five region masks in Figs. 3A and 3B, and for a pair of eleven region masks in Figs. 4A and 4B. With reference to Fig. 4B, when the message signal beam deflection first reaches the value 7, a signal "11" goes over the line and causes a receiver beam deflection to the eleventh receiver mask region whose light transmission is proportional to 7 and a corresponding signal appears in the receiver circuit. As the transmitter cathode beam 48 advances, in its upward progress, it impinges in succession on the regions 8, 9, 10, 11, 6 of the transmitter mask, giving rise in similar fashion to transmitted signals proportional to the numbers 6, 3, 4, 8, 1. At the receiver station the beam 48′ is deflected over the receiver mask in proportion to the same numbers 6, 3, 4, 8, 1, giving rise in the output circuit to signals proportional to the numbers 8, 9, 10, 11, 6. Thus there is reconstituted at the receiver the signal proportional to the original deflection 6, 7, 8, 9, 10, 11, 6, which is equal to the original message signal 0, 1, 2, 3, 4, 5, 0, with the constant bias of 6 added. The receiver apparatus disregards the bias, and so the original message is reconstructed, while on the transmission path it was enciphered in the form 1, 11, 6, 3, 4, 8, 1, and so was completely unintelligible to unauthorized persons.

This operation is graphically depicted in Fig. 5, wherein A denotes the message signal amplitude at a particular instant, $M_1$ denotes the transmitter mask, S the signal output of the transmitter mask and therefore the signal amplitude on the transmission path, $A_2$ ($=S_1$) the amplified amplitude of the enciphered signal at the receiver station, $M_2$ the receiver mask, and finally $S_2$ ($=A_1$) the amplified amplitude of the reconstructed message signal. In this figure the bias complication is disregarded.

Figure 6A:
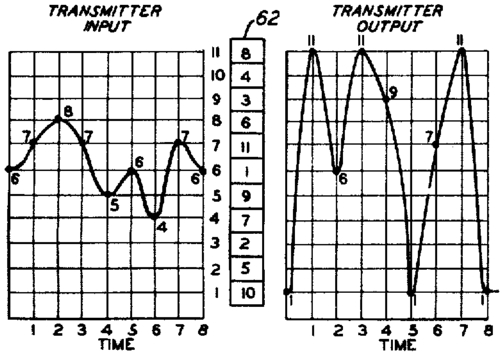
Figs. 6A and 6B are diagrams similar to those of Figs. 4A and 4B but showing the ciphering and deciphering of a representative portion of a message signal.
Figure 6B:
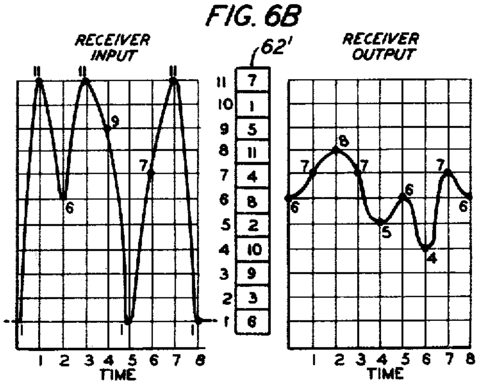

Figs. 6A and 6B illustrate the operation of the system including the same masks as were employed in Figs. 4A and 4B but with a more representative message signal. With the central beam bias at the transmitter, the transmitter beam deflection values at successive instants of time are proportional to the numbers 6, 7, 8, 7, 5, 6, 4, 7, 6. This gives rise to a cipher signal on the line whose successive values are proportional to the numbers 1, 11, 6, 11, 9, 1, 7, 11, 1. At the receiver, this cipher signal deflects the receiver beam from its biased position on the first receiver mask region, and, by dint of the deciphering action of the receiver mask 62', the original message signal is reconstructed in the receiver.

Figure 7A:
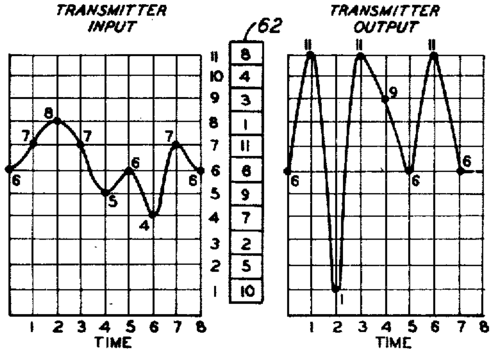
Figs. 7A and 7B are diagrams similar to those of Figs. 6A and 6B for apparatus using modified masks.
Figure 7B:
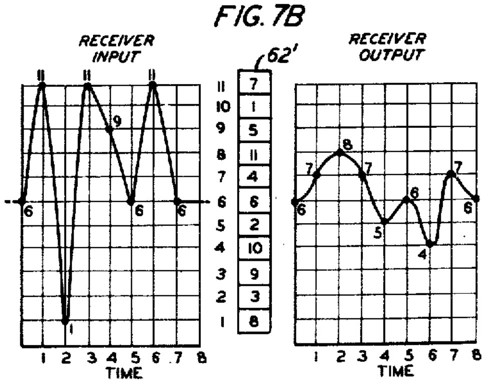

Figs. 7A and 7B illustrate the operation of a slightly modified system in which the necessity for compensatory beam biases is dispensed with by proper selection of the central or no-signal region of the transmitter and receiver masks. In each case the undeflected position of the beam is centered on the central mask region, whose light-transmission value is proportional to the number 6. By following through the ciphering and deciphering steps in the manner outlined above it will be seen that the message signal is again ciphered, deciphered and reconstructed. While on the transmission line it is ciphered and unintelligible to unauthorized persons. Moreover, the line signal differs in detail from that of Fig. 4. This illustrates the ease with which a cipher may be altered, merely by replacing one pair of matched masks with another.

In the first simplified example of Figs. 4A and 4B the message signal amplitude was considered as changing very slowly, and the pulsing feature could properly be disregarded. In the second and third simplified examples of Figs. 6A, 6B, 7A and 7B, however, certain parts of the message signal, notably from deflections 7 to 5, 6 to 4, 4 to 7, caused the beam to sweep rapidly over intermediate mask regions. Without more, this would cause undesired high frequency signal components to be transmitted which represent noise rather than ciphered signal. These simplified examples were discussed in order to lay the foundation for a fuller description of the invention, including the pulsing feature, and including a more complex mask arrangement and its effect on a representative message signal. The transmitter mask may have, for example, twenty different regions with twenty different light-transmission values arbitrarily distributed among them, as in Table I, below, wherein "H" stands for height, measured along the mask from one end and "L. T." stands in each case for the light transmission of the region in question. A representative example of a portion of a complex message wave to be transmitted is shown in Fig. 8, and its amplitudes ("A") at successive instants ("*t*") are tabulated in Table II, in which for any particular row, the second and third columns contain the same two numbers as appear in Table I, but arranged in the time sequence with which they occur with the complex wave of Fig. 8 instead of being arranged in the space sequence of Fig. 3A. Because deflection of the beam ("H") is in proportion to the message signal amplitude ("A") the second column of Table II is headed "A=H."

*Table I*

| H | L. T. |
|---|---|
| 20 | 17 |
| 19 | 5 |
| 18 | 2 |
| 17 | 20 |
| 16 | 10 |
| 15 | 3 |
| 14 | 11 |
| 13 | 8 |
| 12 | 9 |
| 11 | 15 |
| 10 | 14 |
| 9 | 6 |
| 8 | 19 |
| 7 | 12 |
| 6 | 4 |
| 5 | 13 |
| 4 | 7 |
| 3 | 18 |
| 2 | 1 |
| 1 | 16 |

*Table II*

| t | A=H | L. T. |
|---|---|---|
| 0 | 12 | 9 |
| 1 | 13 | 8 |
| 2 | 14 | 11 |
| 3 | 16 | 10 |
| 4 | 17 | 20 |
| 5 | 16 | 10 |
| 6 | 15 | 3 |
| 7 | 13 | 8 |
| 8 | 13 | 8 |
| 9 | 12 | 9 |
| 10 | 9 | 6 |
| 11 | 4 | 7 |
| 12 | 2 | 1 |
| 13 | 3 | 18 |
| 14 | 6 | 4 |
| 15 | 10 | 14 |
| 16 | 9 | 6 |
| 17 | 5 | 13 |
| 18 | 6 | 4 |
| 19 | 13 | 8 |
| 20 | 17 | 20 |
| 21 | 16 | 10 |
| 22 | 12 | 9 |
| 23 | 10 | 14 |
| 24 | 8 | 19 |
| 25 | 8 | 19 |

When at the transmitter, the message wave adopts, at each successive instant (*t*) an amplitude (A), it deflects the cathode beam 48 by a proportional amount (H) and impinges on a particular region of the mask. Of the light produced by impact of the beam on the fluorescent screen, a proportion (L. T.) reaches the photocell 61 to give rise to a ciphered signal. The relation between the magnitude L. T. and the magnitude A=H is wholly arbitrary. At the same time, the cathode beam 48 is periodically "sampled," for example, by application of periodic voltage pulses to the control grid 42. The pulsed beam constitutes a sequence of short "samples" of the message wave of Fig. 8. The result of modifying the samples of the successive amplitudes of the message of Fig. 8 by the mask of Table I is to produce the coded pulse sequence of Fig. 9. Thus, referring to Fig. 8 and Table I together, at the zero instant, when the message has an amplitude of 12 units, the pulsed cathode beam will impact that part of the fluorescent screen 45 which lies behind the 12th region upward along the mask 62, whose light transmission value is 9. At the next or number one instant the pulsed beam will have moved to the 13th region and the corresponding light transmission is 8. By the number two instant the message amplitude and therefore the vertical deflection of the beam will have reached a value of 14, to which corresponds a light transmission value of 11. By the number three instant, the beam will have reached the 16th region whose light transmission value is 10, and so on.

Corresponding to the light transmission value of each discrete region of the mask 62 a definite amount of light reaches the photoelectric cell 61 for each pulsation of the cathode beam 48. The sequence of current pulses which result in the output circuit of the photoelectric cell 61 is depicted in Fig. 9. Passage of this pulse sequence, in turn, through the low-pass filter 63 eliminates the individuality of the separate pulses and gives rise to the enciphered signal wave of Fig. 10, which is of the same form as the envelope of the pulses of Fig. 9. Though it has been uniquely derived from the message wave of Fig. 8 the signal of Fig. 10 bears no decipherable relation thereto so that the signal transmitted over the line 68, whether by modulation onto a high frequency carrier wave as indicated in Fig. 1 or not, is wholly undecipherable by and wholly unintelligible to unauthorized persons. Thus the invention serves to apply an arbitrary code or cipher to a sequence of instantaneously taken samples of the original wave, and therefore indirectly to the original message signal itself.

If preferred, the sampling of the message signal wave may be accomplished by lateral deflection of the cathode beam 48 across the mask 62, as by application of a saw-tooth wave from the amplifier 33 to the horizontal deflection plates 44 of the cathode ray tube 40.

A feature of the present system is that the apparatus at the receiver end of the transmission path is substantially similar to the apparatus at the transmitter end, the incoming ciphered signal going through substantially identical transformations as the original message underwent at the transmitter. Thus, referring to Fig. 2, the incoming signal, assumed to consist of a carrier-frequency voltage modulated with the enciphered message and with synchronizing signals, may be conceived of as arriving on a transmission line 68'. The cipher signal is obtained from the modulated carrier by a detector 70 of conventional design and the signal is divided into two parts by the filters 71 and 72, the first of which passes the coded message components and the second the synchronizing signal components. The oscilloscope 40' and its associated operating voltage supply, the pulse generating triode 10', the saw-tooth wave amplifier triode 30', the lens 60', the photoelectric cell 61', the variable gain amplifier 53', and the biasing circuits may all be identical with corresponding components of the transmitter apparatus and are indicated by similar reference characters distinguished by primes. The relaxation oscillator may likewise be the same as the relaxation oscillator at the transmitter station but is preferably provided with suitable means for holding its oscillations in synchronism with those at the transmitter station. Thus, a winding of a transformer 73 is indicated in series with the grid circuit of the relaxation oscillator tube 10', synchronizing signals from the filter 72 being applied to the terminals of the primary winding of this transformer. The receiver light mask 62' has as many distinct regions as the transmitter light mask 62 and the light transmission characteristic of each region is related to the light transmission characteristic of a corresponding region of the transmitter light mask 62 in the compensatory manner explained above and illustrated in Figs. 3 to 7. In operation, the receiver beam bias is first set by adjustment of the bias source 55' to match the transmitter beam bias. For example, if the quiescent or no-signal position of the transmitter beam was on the 10th region of the transmitter mask, whose light transmission value is 14, then the receiver bias is adjusted, in the absence of a received signal, to strike the fluorescent screen 45' immediately behind the 14th receiver mask region whose light transmission value is 10. The incoming ciphered signal wave which, after detection, is a replica of the wave of Fig. 10, is applied, after adjustment of its amplitude to the proper value by adjustment of the gain of the amplifier 53', to the vertical deflection plates 43' of the beam tube 40' to cause deflection of the cathode beam 48' in proportion to the amplitudes of the ciphered signal, i. e., of the wave of Fig. 10. At the same time this wave is sampled, either by application of the pulses 21' from the triode 20' to the control grid 42' of the tube 40' or by application of saw-tooth waves from the amplifier 33' to the horizontal deflection plates 44' to cause transverse deflection of the beam 48' across the mask 62'. This sampling process effectively reproduces the pulse sequence of Fig. 9 from the wave of Fig. 10. The pulsed or deflected beam 48' impinges instantaneously on that part of the fluorescent screen 45' which lies behind one or other of the different regions of the mask 62' and light is projected onto the photoelectric cell 61' in an amount proportional to the light transmission value of the particular mask region instantaneously affected by the cathode beam.

Just as the transmitter mask translates a message signal such as that of Fig. 8 into a cipher pulse sequence such as that of Fig. 9, so the receiver mask deciphers the latter with the result that the current in the output circuit of the photocell 61' consists of a sequence of pulses whose successive amplitudes are proportional to the original message signal samples. These pulses may then be passed through a low-frequency pass filter 74, for example one which passes all the component frequencies of the message, but blocks the pulse frequency; i. e., in the example employed above for illustrative purposes, the filter pass band should extend from zero to 4,000 cycles per second or slightly above this frequency and should attenuate the 8,000 cycles per second pulse frequency and all higher frequencies. The current output of the filter 74 is then a substantial replica of the original message signal. It may be amplified, as by an amplifier 75 and then supplied to an appropriate message-reconstituting device, schematically indicated as a telephone receiver 76 through which it can be heard as the original message.

With a given transmitter mask, the instantaneous magnitude of the enciphered signal output, corresponding to a particular instantaneous value of the original message, depends on a number of factors, for example the transmitter cathode beam strength, the beam deflection factor, i. e., vertical deflection per unit input signal, vertical beam bias, and the like. Evidently, in order that an intelligible message may be reconstituted at the receiver it is necessary that the receiver beam strength, deflection factor, bias and the like, be properly correlated with corresponding factors at the transmitter. Alteration of any one of these factors at the transmitter effects a change in the wave form of the enciphered signal (Fig. 9) which corresponds to a given message (Fig. 8) and so, in effect, produces a new cipher, which can be deciphered by a compensating change in the corresponding factor at the receiver. Therefore the invention makes for great ease and facility in changing from one cipher to another, not only by replacing one matched pair of masks (Figs. 3A and 3B) with a different matched pair, but also, for a given pair of masks, by replacing one matched set of circuit adjustments with a different matched set.

While the invention has been described in conjunction with a cipher mask which, for illustrative purposes, has been taken as a light mask of rectilinear form disposed externally to the cathode beam tube, a ciphering element of different shape or one having characteristics of a different sort may equally well be employed. For example, the mask may be arranged in the form of a spiral, successive regions being adjacent along the spiral arc. Or it may be a rectangular array in which the first region of any line of regions "follows" the last region of the preceding line. Means are known in the art for deflecting a cathode beam along arrays of these types. Again, the mask may be an array of regions having different opacity characteristics to the electron beam, in which case it may be placed inside the envelope of the cathode beam tube, in position to be directly impinged by the beam, thus being itself a beam target and performing the function of the fluorescent screen of Figs. 1 and 2 as well as the function of the mask. In this case the photocell may be dispensed with, the mask itself giving rise in a suitable output circuit to a current having the wave form of the enciphered signal of Fig. 9.

In the embodiment described above, the auxiliary signal in the form of a cathode beam is deflected in direct proportion to the message signal amplitude. Departures from this proportional relation are within the spirit of the invention, as is also control of the auxiliary signal by some characteristic of the message signal other than its amplitude. Furthermore various combinations are possible of transmitter apparatus of one type with receiver apparatus of a different type, it being only necessary to preserve the compensating relation between the transmitter mask or its equivalent and the receiver mask or its equivalent which is exemplified in Figs. 3A and 3B.

What is claimed is:

1. Apparatus for translating a first intelligence bearing signal of one time variation character into an enciphered signal of a different time variation character which comprises auxiliary movable means, a static, spatially extended member having a plurality of diverse regions, said regions being serially disposed lengthwise of said member in an apparently fortuitous distribution of dissimilarities, each of said regions giving a response to the position of said movable means, all of said responses being different in a selected characteristic, said regions being so disposed along said lengthwise dimension to produce an irregular progression of said response characteristics, means solely responsive to said first intelligence bearing signal for controlling the position of said movable means lengthwise of said extended member by a selected characteristic of said signal to be translated, and means for collecting responses of said member in sequence to provide a translated signal.

2. Apparatus for translating a first intelligence bearing signal of one time-variation character into an enciphered signal of a different time variation character which comprises auxiliary movable means, a static, spatially extended member having a plurality of diverse regions, said regions being serially disposed lengthwise of said member in an apparently fortuitous distribution of dissimilarities, each of said regions giving a response to the position of said movable means, each of said responses being different in a selected characteristic from the response of every other region, means solely responsive to said first intelligence bearing signal for controlling the position of said movable means lengthwise of said extended member by a selected characteristic of the signal to be translated, means for alternately and repeatedly abolishing and restoring said movable means at a frequency substantially higher than the highest frequency component of the signal to be translated, and means for collecting responses of said member in sequence to provide a translated signal.

3. Apparatus for translating a first intelligence bearing signal of one time-variation character into an enciphered signal of a different time variation character which comprises auxiliary movable means, a static, spatially extended member having a plurality of diverse regions in series disposition lengthwise thereof in an apparently fortuitous distribution of dissimilarities, each of said regions giving a response to the position of said movable means, all of said responses being different in a selected characteristic, means solely responsive to said first intelligence bearing signal for controlling the position of said movable means lengthwise of said extended member by a selected characteristic of the signal to be translated, means for controlling the position of said movable means transversely of said extended member at a frequency substantially higher than the highest frequency component of the signal to be translated, and means for collecting responses of said member in sequence to provide a translated signal.

4. Apparatus for translating a first intelligence bearing signal of one time-variation character into an enciphered signal of a different time variation character which comprises means for developing a cathode beam, a target for said beam having a plurality of diverse regions, said regions being serially disposed lengthwise of said target in an apparently fortuitous distribution of dissimilarities, each of said regions giving a response to impact of said beam, each of said responses being different in a selected characteristic from the response of every other region, said regions being aligned in irregular order with respect to their signal response characteristics, means solely responsive to said first signal for deflecting said beam lengthwise of said target under control of a specified characteristic of the signal to be translated, and means for collecting responses of said target in sequence to provide an enciphered translated signal.

5. Apparatus for translating a first intelligence bearing signal of one time-variation character into an enciphered signal of a different time-variation character which comprises means for developing a cathode beam, a target for said beam having a plurality of diverse regions, said regions being serially disposed lengthwise of said target in an apparently fortuitous distribution of dissimilarities, each of said regions giving a response to impact of said beam, each of said responses being different in a selected characteristic from the response of every other region, said regions being in lengthwise alignment in irregular order with respect to their signal response characteristics, means solely responsive to said first signal for deflecting said beam lengthwise of said target under control of a specified characteristic of the signal to be translated, means for abolishing and recreating said cathode beam at a rate substantially higher than the highest frequency component of the signal to be translated, and means for collecting responses of said target in sequence to provide an enciphered translated signal.

6. Apparatus for translating a first intelligence bearing signal of one time-variation character into an enciphered signal of a different time-variation character which comprises means for developing a cathode beam, a light-emissive target for said beam, a light mask beyond said target, said mask having a plurality of diverse regions, said regions being serially disposed lengthwise of said mask in an apparently fortuitous distribution of dissimilarities, each of said regions giving a response to impinging light, all of said responses being different in a selected characteristic, said regions being disposed in said lengthwise array in an irregular order with respect to their signal responsive characteristics, means for deflecting said beam lengthwise of said target under control of a specified characteristic of the signal to be translated, and means for collecting responses of said mask in sequence to provide said enciphered translated signal.

7. In an electric signaling system adapted to develop a cipher signal which is fully but unintelligibly related to a message signal to be translated, means for developing an electric current proportional to said message signal, means for developing a cathode beam, an extended ciphering element having a plurality of differently beam-responsive regions linearly spaced along its length, said regions being irregularly disposed with respect to their relative beam responsive properties, means solely responsive to the instantaneous amplitude of said message signal for directing said beam toward said element, means for deflecting said beam lengthwise of said element, and means for deriving an electric cipher signal from the cooperative association of said beam with each of said regions.

8. In an electric signaling system adapted to develop a ciphered signal which is fully but unintelligibly representative of a message signal to be transmitted, a spatially extended member having a plurality of different regions spaced lengthwise thereof, each of said regions having a signal responsive characteristic differing from those of all others of said regions, said regions being irregularly disposed one to another with respect to their relative signal responsive characteristics, means for associating each instantaneous amplitude value of said message signal with one of said regions, and means for developing another signal related to the characteristic of the region so associated.

9. Apparatus for translating a first intelligence bearing signal wave which varies in magnitude as a certain function of time into an enciphered signal wave which varies in magnitude as a certain different function of time such that the variations in the time-magnitude characteristics of said waves are apparently unrelated, which apparatus comprises a static spatially extended member having a plurality of differently signal responsive regions serially arranged contiguously along a lengthwise dimension thereof in an apparently fortuitous distribution of dissimilarities, each of said contiguous regions possessing a signal responsive characteristic that differs from the corresponding characteristic of every other region, said regions collectively presenting a series of irregular signal responses in progression along said dimension, a source of an auxiliary signal independent of said first signal wave and adapted to stimulate signal responses of said regions of said static member, means solely controlled by a single characteristic of said first intelligence bearing signal for associating said auxiliary signal with said differently responsive regions to stimulate signal responses of said regions, and means for collecting said responses in the sequence of their occurrence to form said enciphered signal in translated form.

10. Apparatus for translating a first intelligence bearing signal wave which varies in magnitude as a certain function of time into an enciphered signal wave which varies in magnitude as a certain different function of time such that the variations in the time-magnitude characteristics of said waves are apparently unrelated, which apparatus comprises a static spatially extended member having a plurality of differently signal responsive regions arranged in contiguous relation along a lengthwise dimension thereof, each of said contiguous regions possessing a signal responsive characteristic that differs from the corresponding characteristic of every other region, said regions collectively presenting a series of irregularly changing signal responses in progression along said dimension, a source of an auxiliary signal independent of said first signal wave for stimulating signal responses of said regions of said static member, means solely controlled by the magnitude of said first intelligence bearing signal for associating said auxiliary signal with said differently responsive regions to stimulate signal responses of said regions, and means for collecting said responses in the sequence of their occurrence to form said enciphered signal in translated form.

11. Apparatus for translating a first intelligence bearing signal which varies in magnitude as a function of time into a second intelligence bearing signal which varies in magnitude as a different function of time which comprises a static spatially extended member having a variety of differently signal responsive regions serially arranged contiguously along a lengthwise dimension thereof, each of said contiguous regions possessing a signal responsive characteristic that differs from the corresponding characteristic of every other of said regions, said regions presenting an irregular progression of signal responses along said dimension, a source of an auxiliary signal independent of said first signal for stimulating signal responses of said regions of said static member, means solely controlled by said first intelligence bearing signal for directing said auxiliary signal upon said differently responsive regions to stimulate signal responses of said regions, said directing means operating to deflect said auxiliary signal means along a line parallel to the lengthwise dimension of said static member, the degree of deflection being proportional to the instantaneous magnitude of said first intelligence bearing signal, and means for collecting said responses in the sequence of their occurrence to form said second intelligence bearing signal in translated form.

12. The method of translating a message signal into unintelligible form suitable for privacy transmission which comprises deriving from said message signal a second signal by attenuating instantaneous values of said message signal by various arbitrary amounts such that progressive instantaneous values of the message signal in a given sense are translated into non-progressive values of said second signal, which values are apparently unrelated to the message signal, determining the successive values of the second signal by instantaneous magnitudes of the message signal, and conveying the message by transmission of said second signal.

13. In the operation of a privacy signaling system, the method of translating a received ciphered signal into intelligible form which comprises deriving from said ciphered signal a second signal, changing the instantaneous amplitude values of said second signal by varying amounts which amounts are unrelated in their successive relative magnitudes to the corresponding instantaneous relative magnitudes of said ciphered signal, the selection of said amplitude changes being in accordance with the instantaneous amplitudes of said ciphered signal, said amplitude changes of said second signal being compensatory to a similar relation between the original message signal and said ciphered signal.

14. The method of translating a message signal into unintelligible form suitable for privacy transmission which comprises deriving from said message signal a sequence of instantaneous samples thereof, changing the relative amplitude value of each of said samples by an arbitrary amount which is non-proportional in its magnitude to the difference in magnitude existing between the corresponding samples of said message signal, the selection of the amount of amplitude change being controlled by the magnitude of said instantaneous sample, and deriving from the sequence of said changed instantaneous samples a translated signal wave whose instantaneous magnitude is directly related to the instantaneous magnitude of the envelope of said sequence of samples and whose instantaneous magnitude is but apparently fortuitously related to the instantaneous magnitude of said message signal.

15. The method of privacy transmission of a message signal which comprises translating said signal at one station into a second signal, changing the instantaneous amplitude values of said second signal by factors chosen in accordance with the instantaneous amplitude of said message signal, said factors being non-proportional in their relative successive magnitudes to the corresponding relative instantaneous magnitudes of said message signal, transmitting said changed second signal to a second station, receiving said second signal at said second station, and deriving from said second signal at said second station a third signal, changing the instantaneous amplitude values of said third signal by factors which are non-proportional in their magnitude variations to the corresponding variations in magnitude of said third wave, said factors being serially selected in accordance with the instantaneous magnitude of said third wave, and said factors at said second station being complementary to said factors at said first station to reconstruct said original message signal.

16. A communication system for the secret transmission of message signals comprising means for converting said message signals to a first set of electric signals possessing a given succession of relative amplitudes, coding means for converting said electric signals into a second set of electric signals possessing a succession of relative amplitudes different than said succession of said first set of electric signals, means for transmitting said second set of signals, means for receiving said transmitted signals and associated therewith conjugate decoding means for converting said received signals into a third set of electric signals possessing a succession of relative amplitudes that is substantially the same as the succession of said first set of electric signals, and means for recovering from said third set of signals said message signals, said coding and conjugate decoding devices each comprising a cathode-ray tube, including its fluorescent screen, a light sensitive electron discharge device and a static spatially extended member interposed between said fluorescent screen and said discharge device, means for deflecting the cathode rays of said cathode-ray tubes along a line parallel to a lengthwise dimension of said static members, said deflecting means of said coding device being responsive to the instantaneous amplitudes of said first set of electric signals, said deflecting means of said conjugate decoding device being responsive to the instantaneous amplitudes of said received second set of electric signals, each of said static members comprising a linear series of discrete regions contiguously disposed along a lengthwise dimension thereof, each such region of each member possessing a degree of opacity different from that of every other region of that member, said regions of said coding device member being linearly disposed along said lengthwise dimension according to any desired association of relative degree of opacity and relative linear position and said regions of said conjugate decoding device member being disposed along said lengthwise dimension such that the association of relative linear position and relative degree of opacity is the reverse of said association on said coding device member.

17. A secret transmission system comprising a cathode-ray tube having a fluorescent screen, a source of electron beam to be directed against said screen, and means for deflecting said beam to form a luminescent trace on said screen; a light-transmitting member disposed adjacent said screen over the region thereof against which the beam may be directed, said member having a multiplicity of contiguous regions, each of a different degree of transmissibility; a source of intelligence-bearing message wave varying in magnitude as one function of time; means for applying said wave to said beam deflecting means to deflect said beam to successively different positions on said screen for successively different magnitudes of said wave, whereby successively different regions of said member are effective to transmit the luminescence of said screen; means to convert the successively different values of transmitted light into a signal varying in magnitude as a function of time different from the magnitude-time function of said message wave; and means for transmitting said signal over a selected transmission medium.

FREDERICK B. LLEWELLYN.

REFERENCES CITED

The following references are of record in the file of this patent:

UNITED STATES PATENTS

| Number | Name | Date |
|---|---|---|
| 2,189,898 | Hartley | Feb. 13, 1940 |
| 2,199,066 | Bernstein | Apr. 30, 1940 |
| 2,272,070 | Reeves | Feb. 3, 1942 |
| 2,313,209 | Valensi | Mar. 9, 1943 |
| 2,402,058 | Loughren | June 11, 1946 |
| 2,405,252 | Goldsmith | Aug. 6, 1946 |
| 2,414,537 | Lakatos | Jan. 12, 1947 |

FOREIGN PATENTS

| Number | Country | Date |
|---|---|---|
| 647,468 | Germany | July 5, 1946 |